June 2, 1942. F. LÜDI 2,284,829
ULTRA HIGH FREQUENCY RECEIVING DEVICE
Filed March 6, 1941

Inventor:
Fritz Lüdi,
By Pierce & Scheffler,
Attorneys.

Patented June 2, 1942

2,284,829

UNITED STATES PATENT OFFICE 2,284,829

ULTRA HIGH FREQUENCY RECEIVING DEVICE

Fritz Lüdi, Baden, Switzerland, assignor to Aktiengesellschaft Brown, Boveri & Cie., Baden, Switzerland Application March 6, 1941, Serial No. 382,090
In Switzerland February 27, 1940

6 Claims. (Cl. 250—27)

For the reception of ultra high frequency waves retarding field generators and magnetron generators are frequently used which operate according to the super-regenerative method. Due to the small power of these tubes only very low output voltages can be obtained which for most purposes have to be specially amplified. Considerably higher output voltages can be obtained when receiving ultra high frequency waves, however, if according to the present invention an oscillation tube with phase focusing is used as an oscillation generator employing the super-regenerative method. Very simple conditions as regards the operation of this oscillation generator and thus also a very high quality reception can be achieved according to the invention by equipping the tube with a modulator and an inductor which latter is separated from the former by a transit space, the modulator and inductor being connected to a common oscillation system in such a manner that the ratio of the modulator and inductor voltages is less than unity, whereby the electrode device which serves for the demodulation of the oscillating process to be received according to the oscillatory feedback principle is located behind the inductor, and the oscillatory voltage, at the frequency of which the oscillations excited to correspond to the received signals are interrupted, being employed to vary periodically the beam current intensity whilst the effective acceleration voltage is maintained constant.

Figure 1:
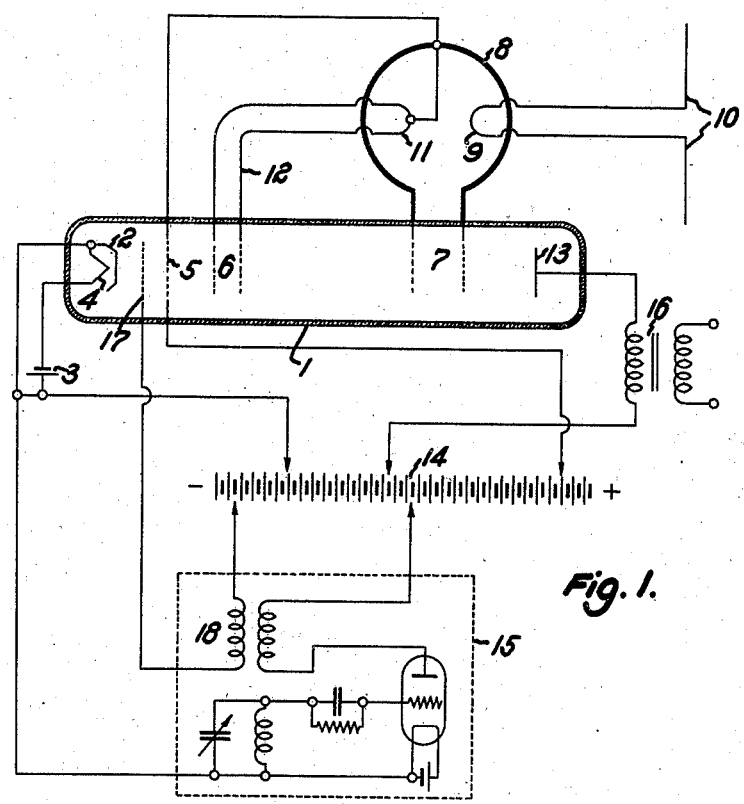
Figure 2:
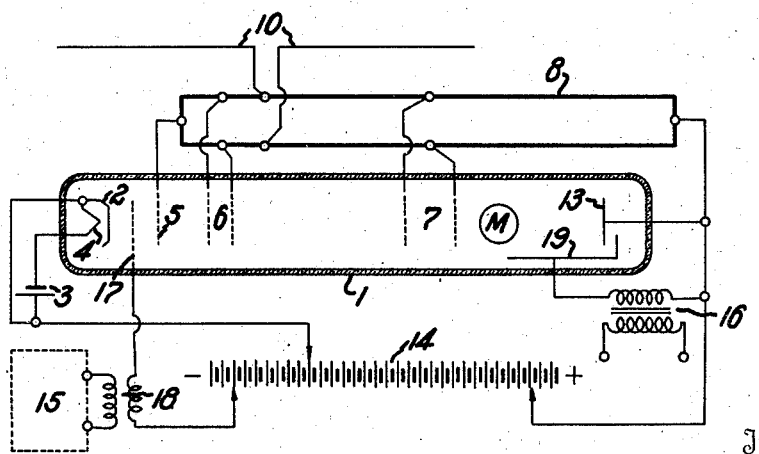

Two constructional examples of the invention are illustrated diagrammatically in Figs. 1 and 2 of the accompanying drawing.

In Figs. 1 and 2, 1 designates the tube which operates as a generator with phase-focused electron beam. The cathode 2 is preferably heated indirectly by means of the heating element 4 connected to the battery 3. The electron beam is accelerated by the acceleration electrode 5 which is maintained at a positive potential and thereupon reaches the space between the two electrodes of the modulator 6. Both these electrodes are preferably located so near to each other that the transit time through the modulator 6 is small when compared with a half cycle of the oscillation produced by the self-excitation of the tube 1. In the modulator 6 the electron beam is subjected in accordance with the self-excited oscillation to a velocity modulation having an ultra high frequency. The resulting phase focusing thus produces electron groups at the inductor 7, which again cause alternating voltages of ultra high frequency at both inductor electrodes. It is an advantage if the transit time of the electron beam through the inductor 7, that is the transit time between the inductor electrodes, is an odd multiple of half the periodic time of the generated ultra high frequency oscillation. This can always be achieved by a corresponding adjustment of the acceleration potential and it is best if this latter is adjusted so that the transit time is equal to half the periodic time. The inductor 7 is connected to an electrical resonator 8 which is tuned to the natural frequency to be generated and consists, for instance as shown in Fig. 1, of a hollow chamber resonator of a known kind, to which by means of the coupling loop 9 the receiving antenna 10 and by means of the coupling loop 11 the conductor 12 are coupled, this latter being connected with the modulator electrodes 6. In the arrangement shown in Fig. 2 the resonator 8 consists of a Lecher system terminating at both ends at current antinodes, the inductor and modulator electrodes and also the receiving antenna 10 being connected to this system. In both arrangements (Figs. 1 and 2) the cathode 2 is connected to a tap on the negative side of the high voltage source 14, whilst the acceleration electrode 5, the modulator 6 and the inductor 7 are connected to a tap on the positive side of the source 14 corresponding to the desired acceleration voltage. The anode 13 is generally also given a positive potential with respect to the cathode. Due to the feedback between the inductor 7 and the modulator 6 the tube 1 will excite itself with a frequency approaching the natural frequency of the resonator 8.

When using the super-regenerative method for the purpose of demodulation it is generally necessary in order to obtain large output powers that the electrode from whose circuit the demodulated voltages are to be tapped, should carry a current whilst the generator is oscillating which differs as much as possible from the current obtained with a non-oscillating generator. In the usual type of generator this difference in the currents is assured by the non-linear part of the tube characteristic. In tubes operating with a phase focused electron beam, the same number of beam electrons always reach the anode, it being assumed that the acceleration, modulator and inductor electrodes are of the perfect grid type, so that the number of electrons during an average time interval is the same with an oscillating and a non-oscillating generator. In order to achieve a super-regenerative effect nevertheless a device is arranged after the inductor electrodes which effects a variation in the electron velocity and divides the beam electrons according to their velocity between two different electrodes. With a non-oscillating phase-focused generator all electrons have the same velocity and are received by only one of the aforementioned electrodes, whilst the other electrode is without current. On the other hand, if the generator oscillates, most of the electrons due to their loss of kinetic energy will be strongly retarded in the inductor so that the other electrode will now naturally receive a large part of the current and the amount of current at the first electrode will be correspondingly reduced. A resistance arrangement can thus be connected into the circuit of one of these electrodes from which demodulated oscillations with comparatively high power can be taken. The periodic fulfillment and non-fulfillment of the conditions of self-excitation for the generator with feed-back in accordance with the auxiliary frequency could then occur in the usual manner by varying the effective acceleration voltage.

Since, however, the acceleration voltage with phase-focused electron beams affects the phase condition of the feed-back, this would have a very detrimental effect on the selectivity. Furthermore a periodic variation of the acceleration voltage in rhythm with the auxiliary frequency causes a continuous variation in the beam velocities so that the aforementioned device for the velocity variation does not give the desired optimum result. Under these circumstances it is better whilst maintaining the effective acceleration voltage constant to alter periodically with the auxiliary frequency only the intensity of the electron beam passing through the inductor. For merely a periodic fulfillment of the feed-back condition the amplitude of the auxiliary oscillation should be given such a magnitude that at least once during its period the intensity of the electron beam is reduced to zero during a time interval which is a multiple of a period of the self-excited ultra high frequency oscillation. As shown in Figs. 1 and 2 of the drawing this is best done by means of a special grid 17 located between the cathode 2 and the acceleration electrode 5 which receives the necessary control voltages over the secondary winding of a high frequency transformer 18 from an oscillator 15 which produces the auxiliary oscillation, and which periodically regulates the electron stream in the desired manner. The control element 17 is preferably supplied from the battery 14 with a negative bias voltage relative to the cathode 2 of the phase-focused ultra high frequency generator 1. In Fig. 1 the auxiliary oscillator 15 is shown in detail whilst in Fig. 2 it is only indicated diagrammatically.

The device for sorting out the velocities as shown in Fig. 1 consists of imposing a bias voltage on the anode 13 through the transformer 16, this voltage being negative with respect to the acceleration voltage. The anode 13 thus acts as a retarding electrode. When the generator does not oscillate the anode 13 receives the entire electrode beam, whilst when the generator oscillates a large part of the electrons passing through the inductor 7 reverse their direction in front of the anode 13 and reach the neighbouring electrode. The anode current therefore decreases when the generator is oscillating so that the oscillations demodulated according to the super-regenerative method can be tapped off at the secondary winding of the transformer 16.

With the arrangement shown in Fig. 2 the velocities are sorted out after the inductor 7 by means of a magnetic field M directed perpendicular to the electron beam, and which is for instance produced by a permanent magnet. The magnetic field deflects the high speed electrons only very slightly so that they reach the anode 13. The slow speed electrons are, however, strongly deflected and pass to the second electrode 19, to whose circuit the transformer 16 is connected, the demodulated oscillations being taken from the secondary winding of this transformer. In this arrangement when the generator is not oscillating, practically no current flows through the electrode 19, whilst with an oscillating generator the current passing through the electrode 19 increases rapidly on account of the energy given off by the electrons in the inductor.

With both the arrangements described it is a great advantage that the effective acceleration voltage is independent of both the auxiliary oscillation of the oscillator 15 and the demodulated oscillations, so that it is possible to apply the super-regenerative method for the demodulation of modulated ultra high frequency waves and obtain a very high efficiency.

I claim:

1. A device for the reception of ultra high frequency waves comprising a phase focusing oscillation tube including a cathode, an accelerating electrode, a modulator, an inductor separated therefrom by a transit space, said modulator and inductor being connected to a common oscillation system in such manner that the ratio of the modulator voltage to the inductor voltage is less than unity and self-excited oscillation is caused, and a demodulating electrode system positioned beyond the inductor, means for maintaining a constant effective accelerating voltage between the cathode and the accelerating electrode and an auxiliary oscillating circuit connected to said oscillation tube to vary the beam current intensity periodically at the frequency at which the oscillations produced in said oscillation system are interrupted.

2. A device as defined in claim 1 in which the demodulating electrode system comprises at least two electrodes and circuit elements including an impedance for tapping off the oscillations imposed on the received high frequency waves from at least one of said electrodes.

3. A device for the reception of ultra high frequency waves comprising a phase focusing oscillation tube including a cathode, an accelerating electrode, a modulator, an inductor separated therefrom by a transit space, said modulator and inductor being connected to a common oscillation system in such manner that the ratio of the modulator voltage to the inductor voltage is less than unity and self-excited oscillation is caused, and a demodulating electrode system positioned beyond the inductor, means for maintaining a constant effective accelerating voltage between the cathode and the accelerating electrode and an auxiliary oscillating circuit connected to an electrode positioned between the cathode and the accelerating electrode of said oscillation tube to vary the beam current intensity periodically at the frequency at which the oscillations produced in said oscillation system are interrupted.

4. A device as defined in claim 1 in which the demodulating electrode system comprises at least two electrodes, means providing a magnetic field in said tube beyond the inductor to divide the electron beam between the electrodes of the demodulating electrode system, and circuit elements including an impedance for tapping off the oscillations imposed on the received high frequency waves from at least one of said electrodes.

5. A device as defined in claim 1 including means for impressing on the demodulating electrode a potential relative to the cathode of the oscillation tube which is smaller than the acceleration voltage.

6. A device for the reception of ultra high frequency waves comprising a phase focusing oscillation tube including a cathode, an accelerating electrode, a modulator, an inductor separated therefrom by a transit space, said modulator and inductor being connected to a common oscillation system in such manner that the ratio of the modulator voltage to the inductor voltage is less than unity and self-excited oscillation is caused, and a demodulating electrode system positioned beyond the inductor, means for maintaining a constant effective accelerating voltage between the cathode and the accelerating electrode, and an auxiliary oscillating circuit connected to said oscillation tube to vary the beam current intensity periodically at an amplitude such that at least once during its period the intensity of the electron beam is reduced substantially to zero during a time interval which is a multiple of the period of the self-excited high frequency oscillations.

FRITZ LÜDI.